United States Patent Office.

OLIVER SCHAFFER, OF DAYTON, OHIO.

Letters Patent No. 102,715, dated May 3, 1870.

IMPROVED COMPOUND FOR REFINING CIDER, WINE, &c.

The Schedule referred to in these Letters Patent and making part of the same.

*To all whom it may concern:*

Be it known that I, OLIVER SCHAFFER, of Dayton, in the county of Montgomery and State of Ohio, have invented a certain Improved Compound for Refining and Clarifying Cider, Wine, and other fermented and unfermented Liquors; and I do hereby declare that the following is a full, clear, and exact description thereof.

The nature of my invention consists in mixing with a quantity of the liquor to be clarified, codfish sounds, saltpeter, and carbonate of magnesia.

To prepare the compound for clarifying cider, for example, I take twenty-four ounces of codfish sounds, two ounces of saltpeter, two ounces of carbonate of magnesia, and put these ingredients in a cask containing ten gallons partially-fermented cider. This mixture, being stirred daily, is left about twelve days to macerate, and at the end of that period of time it is stirred briskly for about five minutes, when it will become foamy and have the consistency of yeast. It is then ready for use, and, to clarify a barrel of cider containing forty gallons, one gallon of the compound is stirred in it, when it is left for about thirty-six hours with the bung out.

In making the compound for clarifying wine, the saltpeter is dispensed with, and slightly diluted wine is used for maceration.

I claim as my invention—

The manufacture or preparation of a compound for clarifying cider, wine, and other liquors, of the ingredients, in the proportions, substantially as set forth.

In testimony whereof I have signed my name to this specification in presence of two subscribing witnesses.

OLIVER SCHAFFER.

Witnesses:
   JAMES LINDEN,
   THOS. D. MITCHELL.